United States Patent [19]

Okada et al.

[11] 4,325,736

[45] Apr. 20, 1982

[54] PROCESS FOR PREPARATION OF AE CONCRETE OR AE MORTAR

[75] Inventors: Eisaburo Okada, Wakayama; Koji Sakagami, Kainan, both of Japan

[73] Assignee: Kao Soap Co., Ltd., Tokyo, Japan

[21] Appl. No.: 110,061

[22] Filed: Jan. 7, 1980

[30] Foreign Application Priority Data

Jan. 17, 1979 [JP] Japan .................................... 54-4111

[51] Int. Cl.³ ............................................. C04B 21/00
[52] U.S. Cl. ........................................ 106/88; 106/90
[58] Field of Search ...................... 106/86, 88, 90, 314

[56] References Cited

U.S. PATENT DOCUMENTS 4,125,410  11/1978  Natsuume .............................. 106/90

*Primary Examiner*—James Poer
*Attorney, Agent, or Firm*—Blanchard, Flynn, Thiel, Boutell & Tanis

[57] ABSTRACT

AE concrete or AE mortar is prepared by incorporating in a cement composition (A) a high-range water-reducing agent for concrete and (B) a foaming substance selected from products obtained by reaction between an $\alpha,\beta$-unsaturated dicarboxylic acid having 4 to 12 carbon atoms or an anhydride thereof and an alkene having 6 to 18 carbon atoms and salts thereof.

12 Claims, No Drawings

PROCESS FOR PREPARATION OF AE CONCRETE OR AE MORTAR

BACKGROUND OF THE INVENTION

1. Field of the Invention

The present invention relates to a process for preparing air-entrained concrete or air-entrained mortar by using a non-air-entraining type high-range water-reducing agent for concrete, a foaming compound and a foam stabilizer in combination. In the description, the wording "air-entrained" is abbreviated as "AE".

2. Description of the Prior Art

Attainment of such effects as (1) improvement of the workability and resulting reduction of the water-cement ratio and the quantity of fine aggregate, (2) increase of the water-retaining force by air bubbles and resulting reduction of bleeding, (3) improvement of the pumpability and (4) improvement of the resistance to freezing and thawing can be expected by incorporating an additive for imparting the air-entraining property (hereinafter referred to as "AE agent") into concrete or mortar.

As popular AE agents, there can be mentioned anionic surface active agents comprising as main ingredients highly oxidized resin acid salts, salts of protein substances, salts of alkyl benzene-sulfonates, triethanolamine salts of alkyl sulfonates and polyoxyethylene alkyl sulfonates, and non-ionic surface active agents comprising polyoxyethylene alkyl aryl ethers, etc.

As the air-entraining type water-reducing agent (hereinafter referred to as "AE water-reducing agent"), there can be mentioned sulfonic acid salts of aromatic hydrocarbon-formalin condensates represented by salts of lignin sulfonate, salts of alkyl naphthalene sulfonate-formalin condensates and sulfonic acid salts of creosote oil decomposition product hydrocarbon-formalin condensates.

As typical instances of the high-range water-reducing agent for concrete, there can be mentioned a high condensate of a β-naphthalene-sulfonic acid-formaldehyde condensate (see Japanese Pat. No. 11737/66) and a sulfonic acid salt of a melamine-formaldehyde polymer (Japanese patent application Laid-Open Specification No. 8080/72), and each of them is of the non-air-entraining type.

Non-air-entraining type high-range water-reducing agents have heretofore been used mainly for so-called high-strength concrete. On the other hand, AE agents or AE water-reducing agents have heretofore been used mainly for construction concrete or concrete having a relatively low strength. Accordingly, a non-air-entraining type high-range water-reducing agent and an AE agent have hardly been used in combination.

Recently, in Germany, a sulfonic acid salt of a melamine-formalin polymer, i.e., a high-range water-reducing agent, has been used as a fluidizing agent for fluidized concrete (Fliss Beton). Furthermore, it has been found that a salt of a high molecular weight condensate of β-naphthalene-sulfonic acid with formalin has very excellent properties as a fluidizing agent for fluidized concrete.

However, it has been experienced that in the preparation of fluidized concrete, bubbles of air entrained into base concrete (concrete before incorporation of a fluidizing agent) with use of an AE agent or AE water-reducing agent are caused to disappear by addition of the above-mentioned fluidizing agent of the high-range water-reducing agent type and attainment of the effects expected for AE concrete, especially the effect of improving the resistance to freezing and thawing, can hardly be attained. Furthermore, in the manufacture of high-strength prestressed concrete products which are exposed to the outer air and undergo freezing and thawing, for example, railroad ties, track slabs and bridge girders, a high-range water-reducing agent and an AE agent are often used in combination. Also in this case, bubbles of entrained air are caused to disappear. In other words, if only a commercially available high-range water-reducing agent and a commercially available AE agent are combined, it is impossible to obtain concrete which is satisfactory in both the high fluidizing property in fresh concrete and the air-entraining property in hardened concrete. American Concrete Institute (ACI) proposed that in connection with the resistance to freezing and thawing, an important characteristic of AE concrete, the air void spacing factor should be less than 250 $\mu$, preferably less than 200 $\mu$, and this air void spacing factor is regarded as an important factor in the manufacture of AE concrete as well as the durability factor at the freezing-thawing test.

When a commercially available AE agent or AE water-reducing agent is used singly, the air void spacing factor of the resulting concrete is less than 200 $\mu$ or slightly larger than 200 $\mu$, and the resistance to freezing and thawing is sufficient. However, when such AE agent or AE water-reducing agent is used in combination with a high-range water-reducing agent (fluidizing agent), even if it is used in an amount larger than the customarily used amount, the air void spacing factor becomes larger than 250 $\mu$ and the resistance to freezing and thawing is reduced.

SUMMARY OF THE INVENTION

In such state of the art, we made researches with a view to developing an AE agent which is characterized in that even when it is used in combination with a high-range water-reducing agent, the resistance to freezing and thawing can be maintained at a level as high as the level attained by single use of an ordinary AE agent and the air void spacing factor can be kept below 200 $\mu$. As the result, we found that a reaction product described below has very good capacities, and we have now completed the present invention based on this finding.

More specifically, in accordance with the present invention, there is provided a process for the preparation of AE concrete or AE mortar, characterized by incorporating in a cement composition (A) a high-range water-reducing agent for concrete and (B) a foaming substance selected from products obtained by reaction between an α,β-unsaturated dicarboxylic acid having 4 to 12 carbon atoms or an anhydride thereof and an alkene having 6 to 18 carbon atoms and salts thereof.

The foaming substance (B) found by us to exert a good air-entraining property in the combined use with the high-range water-reducing agent is a product obtained by reacting an alkene with an α,β-unsaturated dicarboxylic acid or its anhydride in a solvent or in the absence of a solvent under atmospheric pressure or elevated pressure at a normal temperature to 300° C. and optionally neutralizing or hydrolyzing the product with an alkali or amine (ammonia) or neutralizing the product after hydrolysis.

Alkenes having 6 to 18 carbon atoms are preferably used as the alkene in the present invention. More specifically, α-olefins and butadiene oligomers obtained by cracking of petroleum paraffin or polymerization of ethylene, propylene, butylene or the like and olefins obtained by dehydrogenation of petroleum paraffin are preferred.

As the α,β-unsaturated dicarboxylic acid or its anhydride, there are used those having 4 to 12 carbon atoms. For example, there are preferably employed maleic anhydride, maleic acid, fumaric acid, citraconic acid, citraconic anhydride, itaconic acid and itaconic anhydride.

The reaction product between the alkene and α,β-unsaturated dicarboxylic acid according to the present invention is composed mainly of an alkenyl-substituted succinic acid and a polymer of an alkenyl-substituted succinic acid.

As will be apparent from the results of Examples given hereinafter, when a salt of the above-mentioned reaction product is used as an AE agent in combination with a high-range water-reducing agent, the ratio of the alkenyl-substituted succinic acid salt and the alkenyl-substituted succinic acid salt polymer is very important for the property and performance of the AE agent. A preferred weight ratio of alkenyl-substituted succinic acid or its salt/alkenyl-substituted succinic acid polymer or its salt is in the range of from 93/7 to 85/15. The reason why there is present such optimum weight ratio has not been elucidated, but it is believed that the alkenyl-substituted succinic acid or its salt acts as an air-entraining agent and the alkenyl-substituted succinic acid polymer or its salt acts as a foam stabilizer. If the above-mentioned weight ratio is higher than 93/7, the foam-stabilizing activity is reduced, and if the above-mentioned weight ratio is lower than 85/15, the coagulating activity for cement particles is increased, resulting in premature stiffening or slump loss.

As the high-range water-reducing agent (A) that is used in the present invention, there can be mentioned, for example, a salt of a high molecular weight condensate of β-naphthalene-sulfonic acid with formaldehyde and a sulfonic acid salt of a melamine-formalin polymer.

Modes of incorporation of the additives of the present invention will now be described. In preparing concrete or mortar, there may be adopted any of (1) a method in which the high-range water-reducing agent and the foaming substance (B) are kneaded together and dissolved in water and the mixture is incorporated, (2) a method in which the high-range water-reducing agent (A) and the foaming substance (B) are separately kneaded, dissolved in water and incorporated or high concentration aqueous solutions of the agents (A) and (B) are separately incorporated, and (3) a method in which dry solids of the high-range water-reducing agent (A) and foaming substance (B) are incorporated into a cement composition exclusive of water.

The amounts used of the additives of the present invention differ depending on the necessary quantity of air, the required slump, the kinds and amounts of cement and aggregate used, the mixing ratio of the respective materials, the kneading order, the kind and capacity of the kneading machine and the temperature, and they cannot be determined simply. However, in order to attain a standard air quantity of 4.0±0.5% for concrete, which is specified according to the quality standard of surface active agents for concrete, JASS 5T-401 of Japanese Architectural Society and a standard air quantity of 4 to 4.5% for AE concrete specified according to the standard of Japanese Civil Engineering Society, it is preferred that the high-range water-reducing agent (A) be incorporated in an amount of 0.15 to 1.05% by weight based on cement in the case of a salt of a high condensate of β-naphthalene-sulfonic acid with formaldehyde or 0.3 to 2.1% by weight based on cement in the case of a sulfonic acid salt of a melamine-formalin polymer, and that the foaming substance (B) (AE agent) of the present invention be incorporated in an amount of 0.0015 to 0.15% by weight based on cement.

More specifically, an optimum amount of the foaming substance (B) used in the present invention differs depending on the kind of the alkene used for the reaction, that is, the carbon number of the alkenyl group of the reaction product, and when the carbon number is 6 to 10, the optimum amount of the foaming substance (B) is 0.010 to 0.040% by weight based on cement, when the carbon number of the alkenyl group is 12 to 14, the optimum amount is 0.0015 to 0.010% by weight based on cement and when the carbon number of the alkenyl group is 16 to 18, the optimum amount is 0.05 to 0.15% by weight based on cement.

In the present invention, by controlling and adjusting the amount used of the foaming substance (B), the required air quantity of 3 to 6% specified according to the reinforced concrete construction standard (explanation), JASS 5 of Japanese Architectural Society or the required air quantity of 3 to 6% specified according to the standard indication of Japanese Civil Engineering Society can easily be obtained.

The foaming substance (B) found by us to be effectively used in combination with the high-range water-reducing agent exerts a good air-entraining effect even when it is used singly. However, the effect attainable by the single use of the foaming substance (B) of the present invention can be sufficiently attained by a commercially available AE agent, and therefore, the single use of the foaming substance (B) as an AE agent is not advantageous from the economical viewpoint.

As the cement that can be used in the present invention, there can be mentioned, for example, Portland cements such as normal Portland cement, high-early-strength Portland cement, moderate heat Portland cement, white Portland cement and ultra-high-early-strength Portland cement, blended cements such as Portland blast-furnace cement, silica cement and fly ash cement, and special cements such as alumina cement and expansive cement. These cements may be used singly or in the form of a mixture of two or more of them, and in each case, good results can be obtained.

In concrete or mortar prepared according to the process of the present invention, the properties of the high-range water-reducing agent are sufficiently utilized. For example, the resulting AE concrete has such a sufficient resistance to freezing and thawing that the relative dynamic elasticity modulus at 300 cycles of freezing-thawing is higher than 95%, and the bubble space coefficient is less than 200 μ in many cases and if it is large, it does not exceed 230 μ. Namely, the bubble space coefficient does not exceed the critical level specified by ACI.

According to the process of the present invention, AE concrete or AE mortar is prepared by using an AE agent consisting of a reaction product obtained by reaction between an alkene and an α,β-unsaturated dicarboxylic acid or its anhydride or a salt of said reaction product in combination with a high-range water-reducing agent of the non-air-entraining type. In the present invention, instead of the high-range water-reducing agent of the non-air-entraining type, there may be employed a water-reducing agent of the air-entraining type (AE water-reducing agent) such as salt of lignin sulfonate, a salt of a condensate of an alkyl naphthalene-sulfonate with formalin or a sulfonic acid salt of a condensate of a creosote oil decomposition hydrocarbon with formalin in combination with the above-mentioned reaction product or its salt.

Properties of AE concrete prepared according to the process of the present invention will now be described in detail with reference to the following examples.

In these examples, the slump and air quantity of unset concrete were determined according to the methods of JIS A-1101 and JIS A-1128, respectively. The resistance to freezing and thawing and the air void spacing factor were determined according to the method A of ASTM C-666 and the modified point count method of ASTM C-457, respectively. Samples to be subjected to the freezing-thawing test, which had a size of 10 cm×10 cm×40 cm, were prepared according to the method of JIS A-1132.

The reason why we made experiments mainly on the resistance of concrete to freezing and thawing was that we considered that concrete having a sufficient resistance to freezing and thawing would exert the above-mentioned effects (1), (2) and (3) satisfactorily.

The materials used in the Examples were normal Portland cement (manufactured by Onoda Cement), fine aggregate (produced at Kinokawa and having a specific gravity of 2.60 and FM of 2.72), coarse aggregate (crushed stone produced at Takarazuka and having a specific gravity of 2.62, a maximum size of 20 mm and FM of 6.84), and commerically available Mighty 150 (salt of a high condensate of $\beta$-naphthalene-sulfonic acid with formalin manufactured by Kao Soap Co., Ltd., available in the form of a 42% aqueous solution) or commercially available Melment F10 (sulfonic acid salt of a melamine-formalin polymer manufactured by Showa Denko) as a high-range water-reducing agent.

EXAMPLES

The concrete mix proportion used is shown in Table 1.

TABLE 1

| Concrete mix proportion in Examples and Comparisons | | | | | |
|---|---|---|---|---|---|
| W/C (%) | S/A (%) | C (Kgw/m$^3$) | W (Kgw/m$^3$) | S (Kgw/m$^3$) | G (Kgw/m$^3$) |
| 54.3 | 40 | 300 | 163 | 717 | 1079 |

W: water
C: cement
S: fine aggregate
G: coarse aggregate
A: S + G

Kneading was carried for 3 minutes by a forced-kneading type mixer having a capacity of 50 liters.

Results of tests of concrete properties are shown in Table 2.

TABLE 2

Results of Property Tests

| Run No. | Additives: High-Range Water-Reducing Agent — Kind | Amount Added as solid content (% based on C) | AE Agent — Kind | Amount Added as solid content (% based on C) | Air Amount (%) | Slump (cm) | Air Void Spacing Factor ($\mu$) | Relative Dynamic Elasticity Modulus (%) (300 cycles) |
|---|---|---|---|---|---|---|---|---|
| Comparison 1 | — | — | — | — | 1.0 | 3.3 | 973 | destroyed before 50 cycles |
| Comparison 2 | Mighty 150 | 0.25 | — | — | 1.4 | 10.0 | 1109 | destroyed before 50 cycles |
| Comparison 3 | Melment F10 | 0.52 | — | — | 1.0 | 9.4 | 954 | destroyed before 50 cycles |
| Comparison 4 | — | — | a | 0.0054 | 3.7 | 4.5 | 162 | 100 |
| Comparison 5 | — | — | b | 0.0013 | 4.4 | 5.7 | 124 | 98 |
| Comparison 6 | — | — | c | 0.0018 | 4.0 | 7.0 | 147 | 96 |
| Comparison 7 | — | — | d | 0.02 | 3.8 | 7.0 | 446 | destroyed before 50 cycles |
| Comparison 8 | — | — | e | 0.0021 | 4.0 | 5.4 | 160 | 98 |
| Comparison 9 | — | — | f | 0.0009 | 3.9 | 6.5 | 199 | 98 |
| Comparison 10 | Mighty 150 | 0.25 | a | 0.0072 | 4.0 | 13.0 | 244 | 94 |
| Comparison 11 | Mighty 150 | 0.25 | b | 0.0042 | 4.2 | 10.2 | 363 | 92 |
| Comparison 12 | Mighty 150 | 0.25 | c | 0.0075 | 3.9 | 10.7 | 353 | 83 |
| Comparison 13 | Mighty 150 | 0.25 | d | 0.035 | 4.5 | 13.4 | 351 | destroyed before 50 cycles |
| Comparison 14 | Mighty 150 | 0.25 | e | 0.0051 | 3.9 | 6.6 | 225 | 92 |
| Comparison 15 | Mighty 150 | 0.25 | f | 0.0024 | 3.7 | 10.3 | 306 | 92 |
| Comparison 16 | Mighty 150 | 0.25 | S-30 | 0.028 | 3.5 | 8.6 | 235 | 94.2 |
| Comparison 17 | Mighty 150 | 0.25 | S-5 | 0.0025 | 4.0 | 7.5 | 267 | 93.8 |
| Comparison 18 | — | — | S-1 | 0.012 | 4.3 | 8.1 | 126 | 100.2 |
| Example 1 | Mighty 150 | 0.25 | S-1 | 0.017 | 4.0 | 11.8 | 164 | 97.0 |
| Example 2 | Mighty 150 | 0.50 | S-1 | 0.024 | 3.8 | 14.1 | 213 | 95.2 |

TABLE 2-continued

Results of Property Tests

| Run No. | Additives High-Range Water-Reducing Agent Kind | Amount Added as solid content (% based on C) | AE Agent Kind | Amount Added as solid content (% based on C) | Air Amount (%) | Slump (cm) | Air Void Spacing Factor (μ) | Relative Dynamic Elasticity Modulus (%) (300 cycles) |
| --- | --- | --- | --- | --- | --- | --- | --- | --- |
| Comparison 19 | — | — | S-2 | 0.0018 | 4.2 | 5.9 | 135 | 101.3 |
| Example 3 | Mighty 150 | 0.25 | S-2 | 0.0031 | 3.9 | 7.4 | 186 | 98.0 |
| Example 4 | Mighty 150 | 0.50 | S-2 | 0.0046 | 3.6 | 11.4 | 197 | 96.0 |
| Comparison 20 | — | — | S-3 | 0.095 | 3.5 | 5.8 | 147 | 100.4 |
| Example 5 | Mighty 150 | 0.25 | S-3 | 0.063 | 4.1 | 7.8 | 149 | 99.1 |
| Example 6 | Mighty 150 | 0.50 | S-3 | 0.111 | 3.8 | 12.7 | 187 | 101.8 |
| Example 7 | Melment F10 | 0.52 | S-2 | 0.0028 | 4.1 | 7.8 | 173 | 99.0 |
| Example 8 | Melment F10 | 1.01 | S-3 | 0.097 | 3.7 | 10.5 | 190 | 97.5 |

Note
Each of the amounts of the additives is % by weight of the solid based on cement.
a: highly oxidized resin acid salt
b: sodium alkyl benzene-sulfonate
c: sodium polyoxyethylene alkylphenyl sulfate
d: polyoxyethylene alkylaryl ether
e: triethanolamine lauryl sulfate
f: sodium lauryl sulfate
S-30: aqueous solution formed by neutralizing a reaction product of mixed alkenes having 12 to 14 carbon atoms and maleic anhydride with caustic soda and having a polymer content of 31% in the reaction product
S-5: aqueous solution formed by neutralizing a reaction product of mixed alkenes having 12 to 14 carbon atoms and maleic anhydride with caustic soda and fractionated to a polymer content of 4.5% in the reaction product by liquid chromatography
S-1: aqueous solution formed by neutralizing a reaction product of mixed alkenes having 6 to 10 carbon atoms and maleic anhydride with caustic soda and having a polymer content of 13% in the reaction product
S-2: aqueous solution formed by neutralizing a reaction product of mixed alkenes having 12 to 14 carbon atoms and maleic anhydride with caustic soda and having a polymer content of 10% in the reaction product
S-3: aqueous solution formed by neutralizing a reaction product of mixed alkenes having 16 to 18 carbon atoms and maleic anhydride with caustic potash and having a polymer content of 7% in the reaction product From results obtained in Comparisons 1 to 3, it is seen that concrete free of an additive or containing a high-range water-reducing agent alone has no sufficient resistance to freezing and thawing.

In concretes of Comparisons 4 to 6, 8 and 9, a commercially available AE agent is singly incorporated and a good resistance to freezing and thawing is obtained. However, if Mighty 150 is incorporated in these concrete compositions, as is seen from results of Comparisons 10 to 12, 14 and 15, the resistance to freezing and thawing is reduced to such an extent that the relative dynamic elasticity modulus at 300 cycles is lower than 95% and in many cases, the air void spacing factor is very high and exceeds 250 μ, though in some case the air void spacing factor is less than 200 μ.

From the results of Comparisons 7 and 13, it is seen that the AE agent d is not suitable as an additive for AE concrete.

From the results of Comparisons 18 to 20, it is seen that when the AE agent according to the present invention is used singly, it exerts a very good air-entraining effect.

When the results of Comparisons 16 and 17 are compared with the results of Example 3, it is seen that there is present an optimum range for the polymer content in the AE agent.

From the results of Examples 1 to 8, it is seen that according to the process of the present invention, there can be obtained very excellent AE concrete having an air void spacing factor of about 200 μ and a relative dynamic elasticity modulus higher than 95% at 300 cycles of freezing thawing, though the amount of the AE agent of the present invention necessary for attaining the same air amount (4±1%) differs to some extent depending on the kind and amount of the high-range water-reducing agent to be used in combination and the carbon number of the alkenyl group of the AE agent.

The content of the polymer in the reaction product used as the AE agent was presumed by GPC (gel permeation chromatography).

What is claimed is:

1. A process for the preparation of AE concrete or AE mortar, which comprises incorporating in a hydraulic cement composition (A) a high-range water-reducing agent for concrete and (B) a foaming substance consisting essentially of a mixture of (1) 85 to 93% by weight of a reaction adduct of (a) an α,β-unsaturated dicarboxylic acid having 4 to 12 carbon atoms or an anhydride thereof and (b) an alkene having 6 to 18 carbon atoms, or a salt thereof, and (2) 7 to 15% by weight of a polymer of said α,β-unsaturated dicarboxylic acid or an anhydride thereof, and said alkene having 6 to 18 carbon atoms, or a salt thereof.

2. A process according to claim 1 wherein said high-range water-reducing agent is a salt of a high molecular weight condensate of β-naphthalene-sulfonic acid with formaldehyde and the amount added of said condensate salt is 0.15 to 1.05% by weight, based on the cement.

3. A process according to claim 1 wherein said high-range water-reducing agent is a sulfonic acid salt of a melamine-formaldehyde polymer and the amount added of said sulfonic acid salt is 0.3 to 2.1% by weight, based on the cement.

4. A process according to claim 1 wherein the $\alpha,\beta$-dicarboxylic acid is maleic acid, fumaric acid, itaconic acid or citraconic acid.

5. A process according to claim 1 wherein said foaming substance consists essentially of a mixture of an alkenyl-substituted succinic acid or a salt thereof and a polymer of said alkenyl-substituted succinic acid or a salt thereof.

6. A process according to claim 1 wherein the amount addded of said foaming substance is 0.0015 to 0.15% by weight based on the cement.

7. A process according to claim 1 wherein said high-range water-reducing agent for concrete and said foaming substance are simultaneously kneaded together and incorporated and dissolved in water, and the mixture is kneaded with the cement composition.

8. A process according to claim 1 wherein said high-range water-reducing agent (A) for concrete and the foaming substance (B) are separately incorporated and dissolved in water at high concentrations or in the kneaded state, and kneaded with the cement composition.

9. A process according to claim 1 wherein dry solids of said high-range water-reducing agent for concrete and said foaming substance are kneaded together, and the mixture is incorporated into the cement composition exclusive of water.

10. A process according to claim 2 or claim 3 in which said alkene has from 6 to 10 carbon atoms and the amount of said foaming agent is from 0.01 to 0.04% by weight, based on the cement.

11. A process according to claim 2 or claim 3 in which said alkene has from 12 to 14 carbon atoms and the amount of said foaming agent is from 0.0015 to 0.10% by weight, based on the cement.

12. A process according to claim 2 or claim 3 in which said alkene has from 16 to 18 carbon atoms and the amount of said foaming agent is from 0.05 to 0.15% by weight, based on the cement.

* * * * *